(12) United States Patent
Lu et al.

(10) Patent No.: US 7,363,373 B2
(45) Date of Patent: Apr. 22, 2008

(54) DATA SCANNING SYSTEM AND METHOD THEREOF COMBINING REAL-TIME SCANNING AND PERIODICAL SCANNING MODES

(75) Inventors: William Lu, Hsinchu (TW); Eric Chen, Taipei (TW); Kuang-Rong Lu, Taipei (TW); Rick Han, Taipei (TW)

(73) Assignee: Corel TW Corp., Taipei (TW)

( * ) Notice: Subject to any disclaimer, the term of this patent is extended or adjusted under 35 U.S.C. 154(b) by 1076 days.

(21) Appl. No.: 10/238,753

(22) Filed: Sep. 10, 2002

(65) Prior Publication Data

US 2004/0049581 A1    Mar. 11, 2004

(51) Int. Cl.
*G06F 15/173* (2006.01)

(52) U.S. Cl. ...................................... 709/225; 709/219

(58) Field of Classification Search .................. 709/225, 709/229, 217, 219, 203
See application file for complete search history.

(56) References Cited

U.S. PATENT DOCUMENTS

| | | | |
|---|---|---|---|
| 6,377,991 B1 * | 4/2002 | Smith et al. | 709/226 |
| 6,578,073 B1 * | 6/2003 | Starnes et al. | 709/219 |
| 6,643,694 B1 * | 11/2003 | Chernin | 709/223 |
| 2003/0229801 A1 * | 12/2003 | Kouznetsov et al. | 713/200 |

* cited by examiner

*Primary Examiner*—Krisna Lim
(74) *Attorney, Agent, or Firm*—Rosenberg, Klein & Lee

(57) ABSTRACT

The present invention discloses a data scanning system and a method thereof for a server. The method includes steps of defining an auditing period, scanning an accessed data in a default scanning mode from the server by a user, obtaining a credit data of the user, and executing a rearranging process for resetting a reset scanning mode for the user according to the credit data when the auditing period is expired, thereby the default scanning mode being adjustable according to the credit data of the user.

22 Claims, 5 Drawing Sheets

DATA SCANNING SYSTEM AND METHOD THEREOF COMBINING REAL-TIME SCANNING AND PERIODICAL SCANNING MODES

FIELD OF THE INVENTION

The present invention is related to a data scanning system and a method thereof, and more particularly to a data scanning system and a method thereof for a server.

BACKGROUND OF THE INVENTION

A network consists of a server and clients. Comparing with the clients, the server is a better computer of a faster processing capability and a larger storage capacity for providing service of the clients, wherein the clients can access data of the server via the network.

FIG. 1 illustrates a network consisting of a server and clients. Meanwhile data is transmitted between the internet 15 and clients 11, 12 and 13 via a server 14. The server 14 scans the data by means of two following methods.

(1) The server 14 (or an external program) audits the storage space (ex. a memory or a hard disk) in a periodical mode for checking all data which have not been scanned yet.

(2) The server 14 (or an external program) scans the accessed data in a real-time mode, when the accessed data are accessed via the storage space of the server 14.

However in the method (1), no matter whether there is any data which has not been scanned yet, the server 14 (or an external program) has to scan all storage space of the server 14 in the periodical mode. For a user of clients having a lower credit class, the server 14 will easily miss a suitable time for scanning the data accessed by the lower-credit-class user. For a user of clients having a higher credit class, it will waste the extra system resources, for example, the extra memory space and the extra calculating time of the microprocessor for executing the scanning process.

With regard to the method (2), it will waste a lot of the extra system resources, for example, the extra long-term memory space, the extra memory space for scanning and the extra calculating time of the microprocessor to scan the data of the higher-credit-class users. However the real-time scanning process of the higher-credit-class is always unnecessary.

Hence, the present invention is attempted to improve the prior art and provides a data scanning system and a method thereof for a server.

SUMMARY OF THE INVENTION

It is one object of the present invention to provide a data scanning method for a server.

According to the present invention, the data scanning method for a server includes steps of (a) defining an auditing period, (b) scanning an accessed data in a default scanning mode from the server by a user, (c) obtaining a credit data of the user, and (d) executing a rearranging process for resetting a reset scanning mode for the user according to the credit data when the auditing period is expired.

Certainly, the server can be a mail server.

Certainly, the server can be a hypertext transfer protocol proxy server.

Certainly, the auditing period can be adjustable and defined in a configuration database.

Certainly, the default scanning mode can be a real-time scanning mode.

Certainly, the default scanning mode can be a periodical scanning mode.

Certainly, the accessed data can be an electronic mail.

Certainly, the accessed data can be a web page.

Preferably, the server includes a storage space for storing the accessed data by the user as one of a temporary and a perpetual data.

Certainly, the storage space can be a memory.

Certainly, the storage space can be a hard disk.

Preferably, the step (b) further includes steps of (b1) scanning a particular data of the user for generating a result, (b2) obtaining a credit class corresponding to the result, and (b3) recording the credit weight into a credit database to be accumulated as the credit data of the user.

Certainly, the step (b2) can be executed via a specific corresponding mode adjustable and defined in a configuration database.

Preferably, the step (d) further includes steps of (d1) calculating an operated credit class of the user according to the credit data of the user, (d2) comparing the operated credit class of the user with a default class, (d3) resetting a periodical scanning mode as the reset scanning mode when the operated credit class of the user is higher than the default class, and (d4) resetting a real-time scanning mode as the reset scanning mode when the operated credit class of the user is lower than the default class.

Certainly, the default class can be adjustable and set in a configuration database.

Preferably, the periodical scanning mode further includes a periodical scanning period set in a configuration database and adjustable according the credit class of the user.

Preferably, the higher the credit class of the user is, the longer a period of the periodical scanning mode is.

Preferably, the lower the credit class of the user is, the shorter a period of the periodical scanning mode is.

Preferably, the data scanning method can be implemented via a software program.

Certainly, the software program can be included in the sever.

Certainly, the software program can be an external program.

It is one object of the present invention to provide a data scanning system for a server.

According to the present invention, the data scanning system for a server includes a user terminal for accessing a data by a user through the internet, a server connected with the user terminal via the internet and having a configuration database and a credit database for providing a scanning mode, wherein the configuration database includes an auditing period and a default credit class, and the credit database provides an accumulated credit class for the user by scanning the data in the scanning mode in the auditing period, thereby the scanning mode being adjusted according to a comparison between the accumulated credit class of the user and the default credit class.

Certainly, the data can be an electronic mail.

Certainly, the data can be a web page.

Preferably, the server further includes a storage space for storing the data of the user as one of a temporary and a perpetual data.

Certainly, the storage space can be a memory.

Certainly, the storage space can be a hard disk.

Certainly, the server can be a mail server.

Certainly, the server can be a hypertext transfer protocol proxy server.

Certainly, the scanning mode can be a real-time scanning mode.

Certainly, the scanning mode can be a periodical scanning mode.

Preferably, the periodical scanning mode further includes a periodical scanning period defined in the configuration database and adjustable according to the credit class of the user.

Preferably, the higher the credit class of the user is, the longer a period of the periodical scanning mode is.

Preferably, the lower the credit class of the user is, the shorter a period of the periodical scanning mode is.

According to the present invention, the data scanning method for a server includes steps of (a) defining an auditing period, (b) scanning an accessed data from the server by a user in a defaulted scanning mode, (c) accumulating a credit data of the user via a mapping process for the data, and (d) determining whether the defaulted scanning mode of the user should be changed according to the credit data of the user when the auditing period is expired.

Preferably, in the step (c), the data mapping process further includes steps of (c1) scanning the accessed data by the user for generating a result, (c2) obtaining a credit weight corresponding to the result, and (c3) recording the credit weight into a credit database to be accumulated as the credit data of the user.

Certainly, the step (c2) can be executed in a specific mapping mode adjustable and defined in a configuration database.

According to the present invention, the data scanning system for a server includes a user terminal for accessing a data by a user, and a server connected with the user terminal via the internet and having a configuration database and a credit database for providing a scanning mode to scan the data, wherein the configuration database includes an auditing period, and the credit database provides an accumulated credit data of the user by scanning the data in the scanning mode in the auditing, thereby the scanning mode being adjustable according to the default credit data.

According to the present invention, the data scanning system for an internet, includes a user terminal for accessing a data by a user, and a server connected with the user terminal via the internet and scanning the data via an external program providing a default scanning mode, wherein the server includes a configuration database having an auditing period and a default credit class, and a credit database providing an updated credit class of the user through an accumulation of a credit data of the user, thereby the default scanning mode being adjustable according to a comparison between the updated credit class of the user and the default credit class.

According to the present invention, the data scanning system for an internet, includes a user terminal for accessing a data by a user, and a server connected with the user terminal via the internet and scanning the data via an external program providing a default scanning mode, wherein the server includes a configuration database having an auditing period and a default credit class, and a credit database operating the data in the default scanning mode in the auditing period for updating a credit class of the user, thereby the external program adjusting the default scanning mode according to the credit class of the user.

According to the present invention, the data scanning method for a server connecting thereto plural user terminals, wherein the server scans accessed data accessed by one of the plural user terminals by means of a default scanning mode, includes steps of (a) defining an auditing period, (b) executing a mapping process to accumulate plural credit data corresponding to the plural user terminals respectively, and (c) executing a rearranging process for changing the default scanning mode for the plural user terminals respectively according to the plural credit data when the auditing period is expired.

Preferably, the mapping process includes steps of scanning the accessed data of the one user terminal for generating a result, and obtaining a credit class corresponding to the result.

Preferably, the rearranging process includes steps of (c1) calculating a credit class of the respective user terminal corresponding to the credit data of the respective user terminal, (c2) comparing the credit class of the respective user terminal with a default class, (c3) resetting a periodical scanning mode as the default scanning mode when the credit class of the respective user terminal is higher than the default class, (c4) resetting a real-time scanning mode as the default scanning mode when the credit class of the respective user terminal is lower than the default class, and (c5) repeating steps (c1)-(c4) for determining all default scanning modes of the plural user terminals one by one.

Now the foregoing and other features and advantages of the present invention will be more clearly understood through the following descriptions with reference to the drawings, wherein:

DETAILED DESCRIPTION OF THE PREFERRED EMBODIMENT

The present invention provides a data scanning method for a server to improve the prior art and solve the problem of the prior art by means of introducing a real-time scanning mode, a periodical scanning mode and a credit database, thereby the waste of the extra system sources for scanning and the miss of a scanning timing being decreased.

Figure 2:
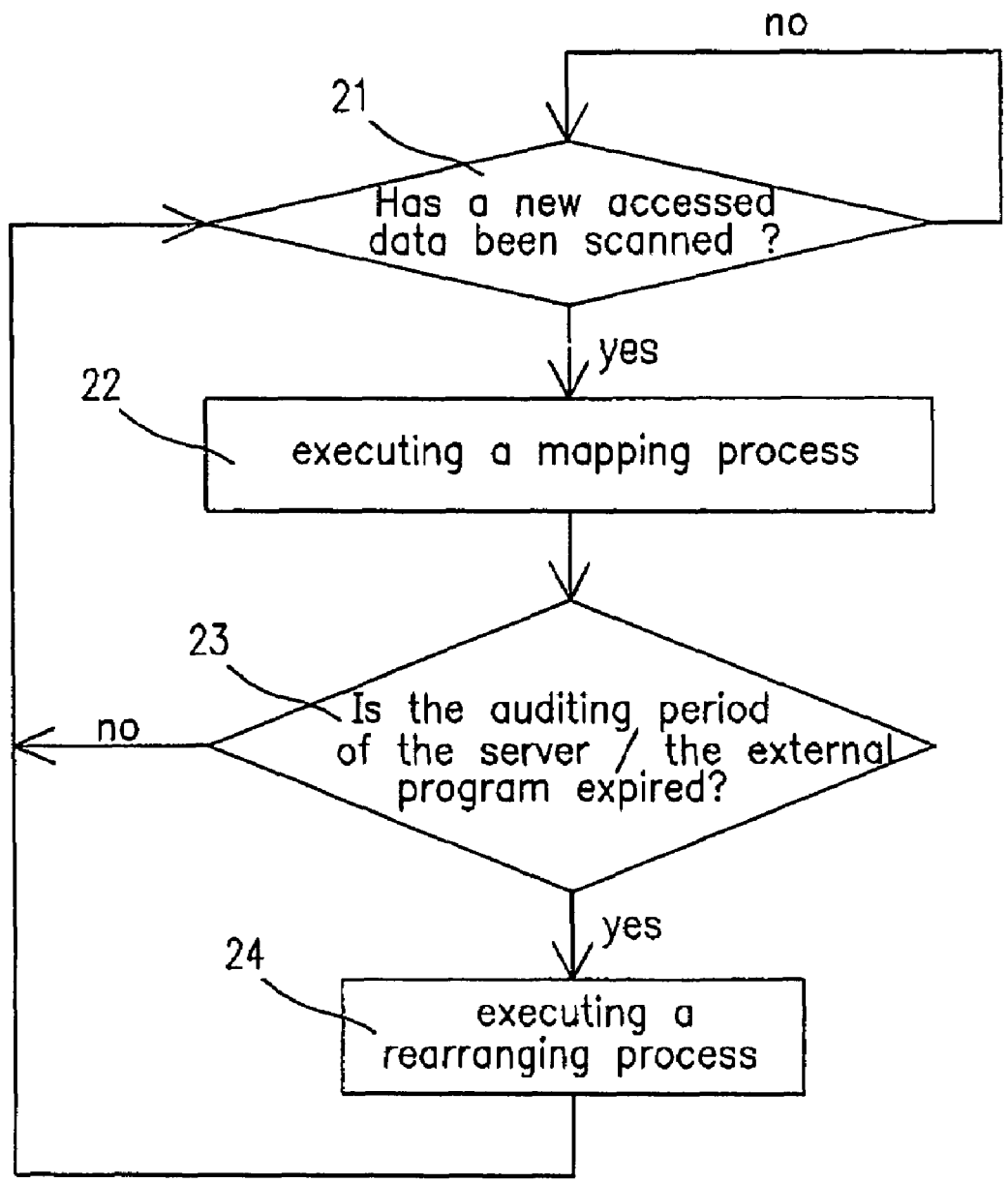
FIG. 2 illustrates a flow chart of a scanning method of the server/the external program in a real-time scanning mode according to the preferred embodiment of the present invention.
Figure 3:
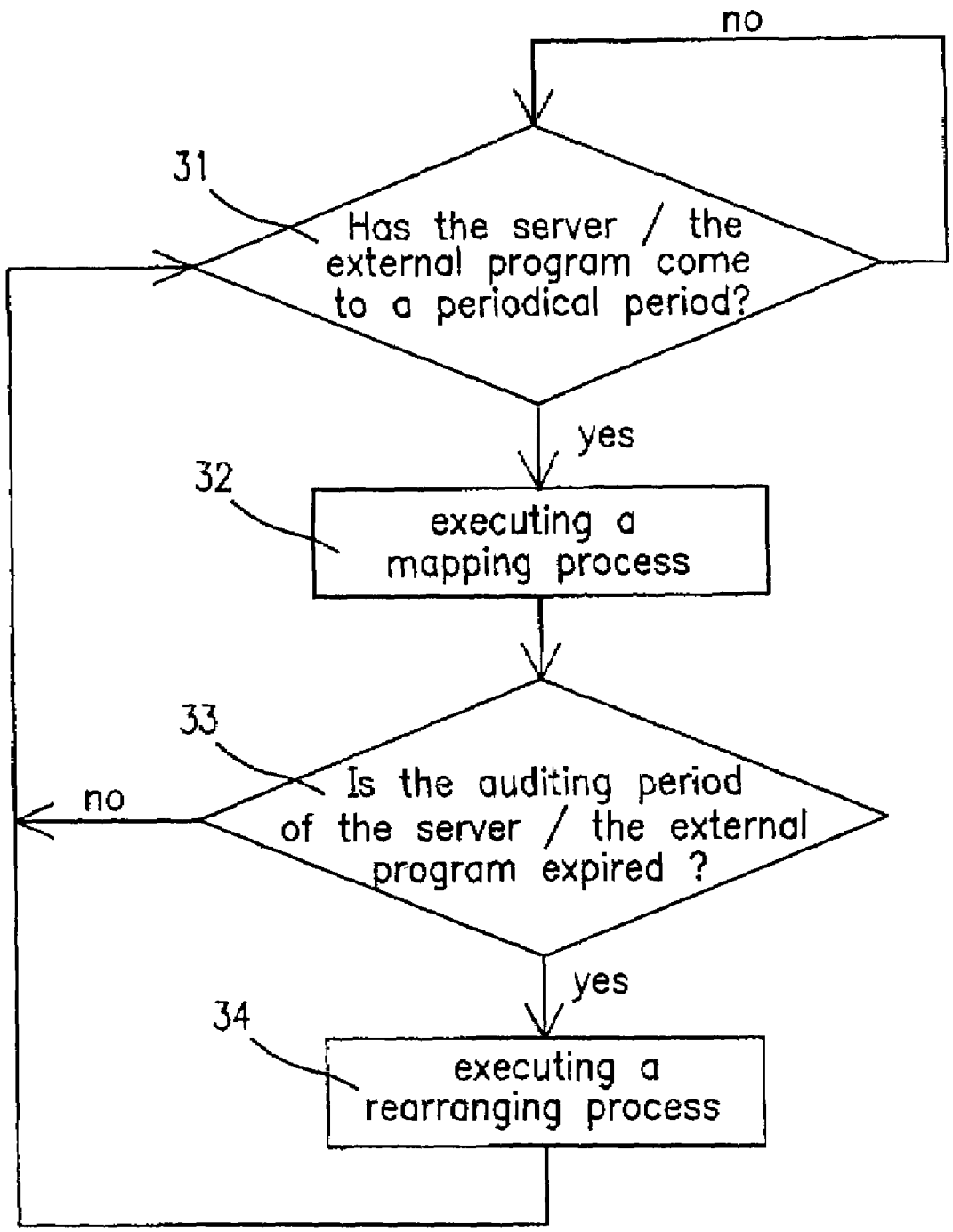
FIG. 3 illustrates a flow chart of a scanning method of the server/the external program in a periodical scanning mode according to the preferred embodiment of the present invention.

Please referring to FIG. 2 and FIG. 3, they respectively illustrate the flow charts of the scanning methods of the server/the external program in a real-time scanning mode and a periodical scanning mode according to the present invention. Meanwhile, the server 14 will execute the data scanning process in the real-time scanning mode of the present invention immediately, while a new accessed data has been scanned 21. The server 14 will execute the data in the periodical scanning mode of the present invention, while the server has come to a periodical period 31. Accordingly, the data scanning method of the present invention, includes steps of (a) defining an auditing period, (b) scanning an accessed data in a default scanning mode, which is one of the real-time scanning mode and the periodical scanning mode, from the server 14 by a user (one of user 11, user 12 and user 13), (c) obtaining a credit data of the user via a mapping process 22, 32, and (d) executing a rearranging process 24, 34 for resetting a reset scanning mode for the user according to the credit data when the auditing period is expired. Meanwhile, the server 14 can be a mail server or a hypertext transfer protocol proxy server. In response to the type of the server 14, the accessed data can be an electronic mail or a web page. Certainly, the server 14 further includes a storage space for storing the accessed data by the user as one of a temporary and a perpetual data, and the storage space can be a memory or a hard disk.

Figure 4:
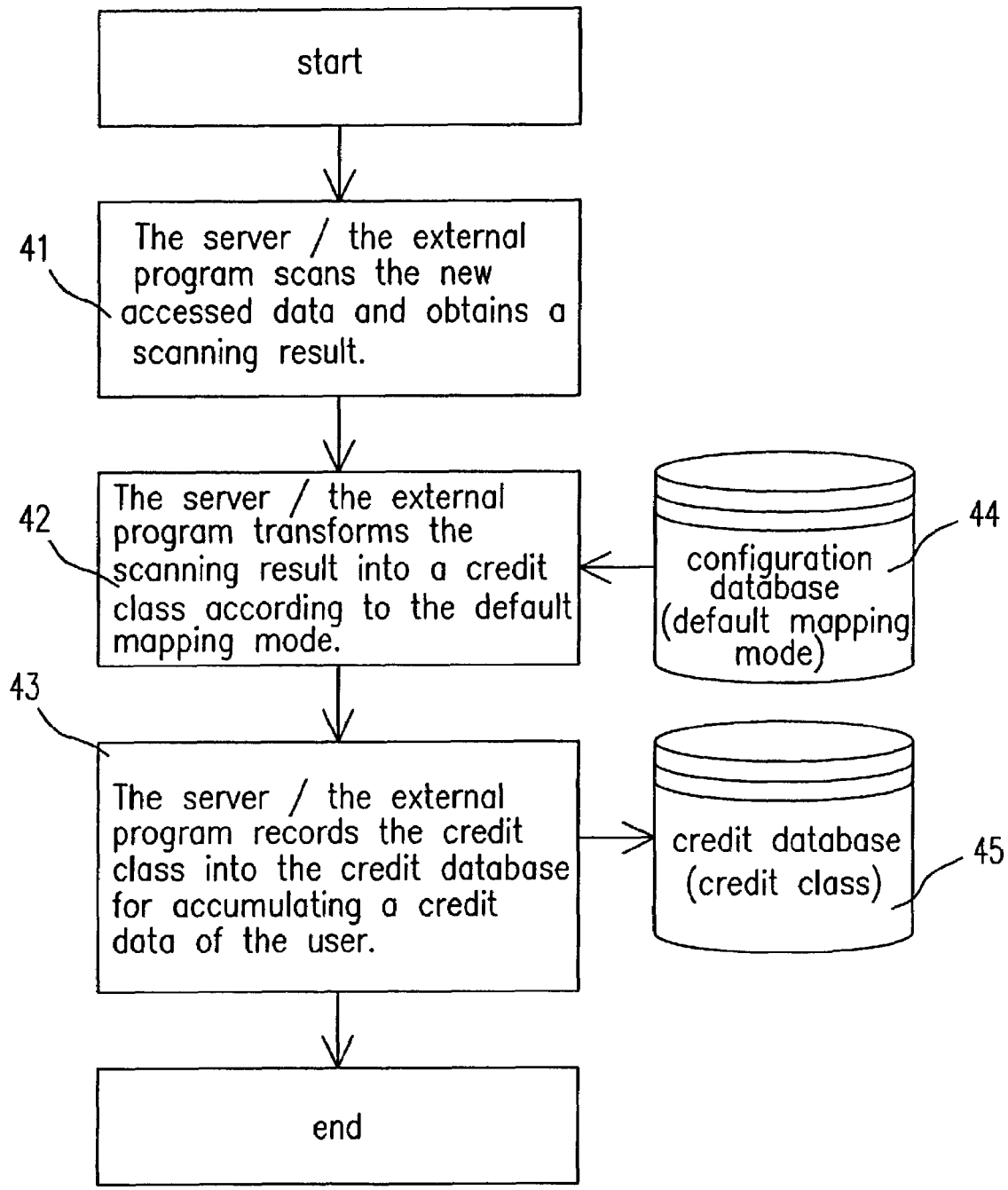
FIG. 4 illustrates a flow chart of a mapping process according to the preferred embodiment of the present invention.
Figure 5:
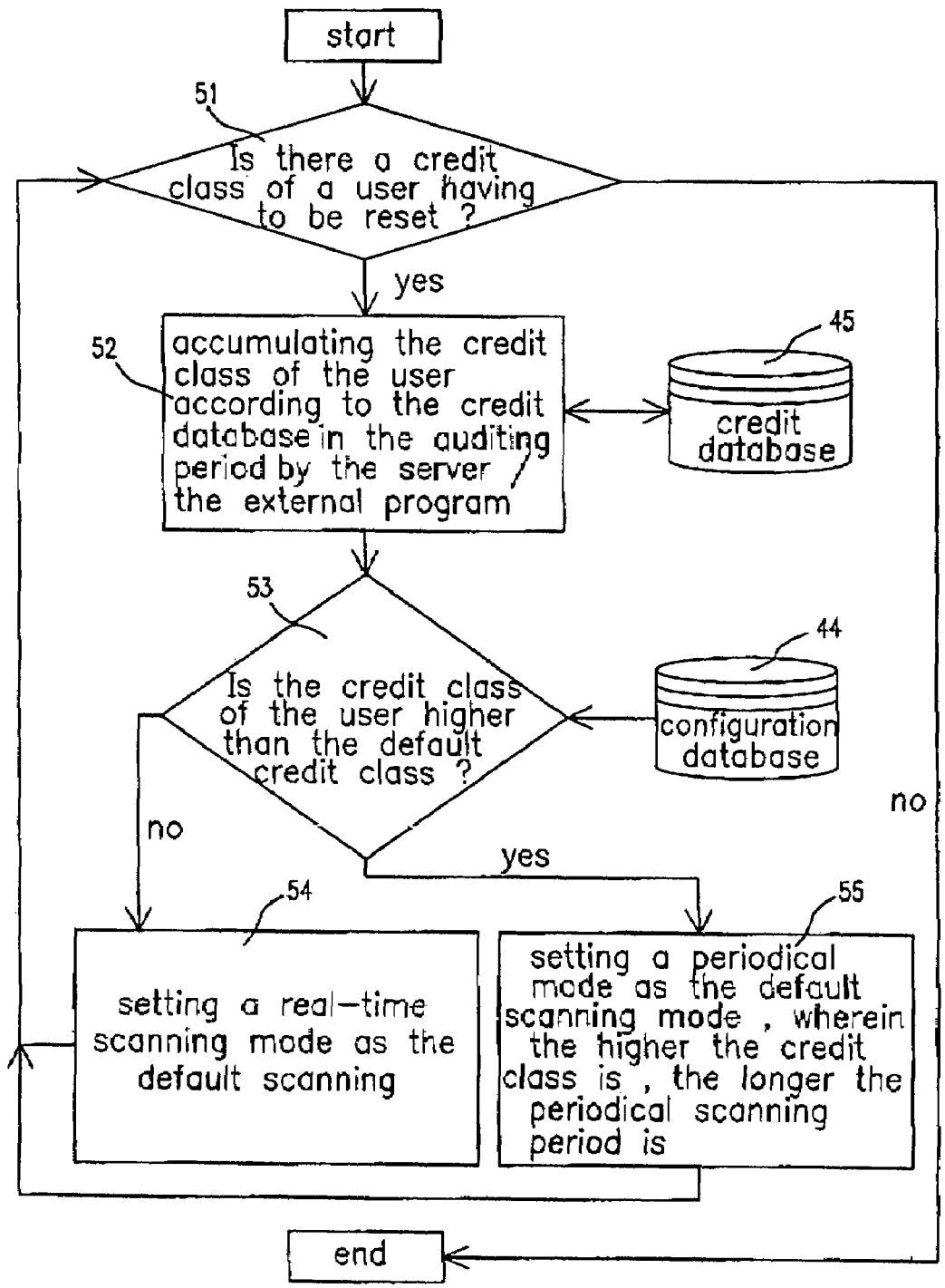
FIG. 5 illustrates a flow chart of a rearranging process according to the preferred embodiment of the present invention.

Please referring to FIG. 4 and FIG. 5, they illustrate a flow chart of the mapping process and the rearranging process according to the preferred embodiment of the present invention. Meanwhile the mapping process includes steps of scanning a particular data of the user for generating a result (step 41), obtaining a credit class corresponding to the result in a specific corresponding mode adjustable and defined in a configuration database 44 (step 42), and recording the credit weight into a credit database 45 to be accumulated as the credit data of the user (step 43). The rearranging process includes steps of calculating an operated credit class of the user according to the credit data of the user stored in a credit database 45 (step 52), comparing the operated credit class of the user with a default class set in a configuration database 44 (step 53), resetting a periodical scanning mode as the reset scanning mode when the operated credit class of the user is higher than the default class (step 55), and resetting a real-time scanning mode as the reset scanning mode when the operated credit class of the user is lower than the default class (step 54). Meanwhile, the periodical scanning mode further includes a periodical scanning period set in the configuration database 44 and adjustable according the credit class of the user. The higher the credit class of the user is, the longer a period of the periodical scanning mode is. The lower the credit class of the user is, the shorter a period of the periodical scanning mode is.

The above embodiment of the present invention indicates that a server manages a user. Actually, a server has to manage a lot of users. Hence the following embodiment of the present invention indicates how a server manages plural users according to the present invention.

Figure 1:
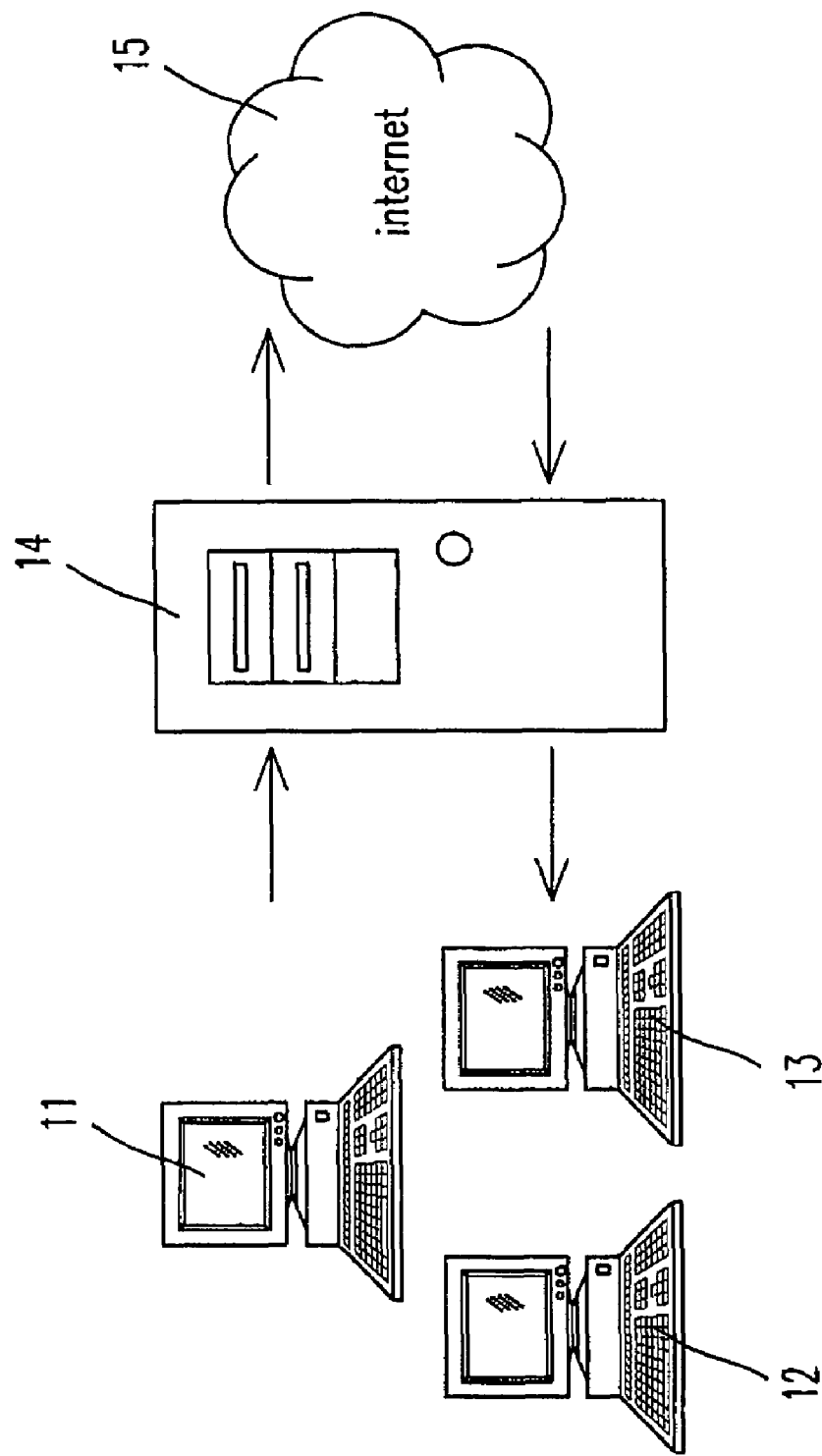
FIG. 1 illustrates a network consisting of a server and clients.

Please referring to FIG. 1, FIG. 3 and FIG. 4, they illustrate a server managing three users (the user 11, the user 12 and the user 13) in the same time, wherein the user 11 is scanned in a real-time scanning mode, and the user 12 and the user 13 are scanned in a periodical scanning mode. According to the present invention, the data scanning method of the present invention includes the following steps. Firstly, an auditing period is defined. For the user 11, when the server 14 or an external program scans an accessed data (step 21), the server 14 or the external program will execute the data scanning process of the present invention. However for the user 12 and the user 13, when the server 14 or the external program has come to a periodical period (step 31), the server 14 or the external program will start to execute the data scanning process of the present invention. No matter which accessed data of the user is scanned, the system of the present invention will execute a mapping process (step 22 and step 32) and accumulate the credit data of the user 11, the user 12 and the user 13 respectively. When the auditing period is expired (step 23 and step 33), the server 14 or the external program will execute a rearranging process (step 24 and 34) to respectively determine whether the defaulted scanning mode of the user 11, the user 12 and the user 13 should be changed. Meanwhile, the server 14 can be a mail server or a hypertext transfer protocol proxy server. In response to the type of the server 14, the accessed data can be an electronic mail or a web page. Certainly, the server 14 further includes a storage space for storing the accessed data by the user as one of a temporary and a perpetual data, and the storage space can be a memory or a hard disk.

Please referring to FIG. 4 and FIG. 5, they illustrate a flow chart of the mapping process and the rearranging process according to the second preferred embodiment of the present invention. Meanwhile the mapping process includes steps of scanning a particular data of the user (which could be one of the user 11, the user 12 or the user 13) for generating a result (step 41), obtaining a credit class corresponding to the result in a specific corresponding mode adjustable and defined in a configuration database 44 (step 42), and recording the credit weight into a credit database 45 to be accumulated as the credit data of the user (step 43). Accordingly, no matter which user accesses a new data, the system of the present invention will execute a mapping process (step 22 and step 32) according to the accessed data and accumulate the credit data of the user 11, the user 12 and the user 13 respectively. As regards the rearranging process for the user 11, it includes steps of calculating an operated credit class of the user 11 according to the credit data of the user stored in a credit database 45 (step 52), comparing the operated credit class of the user 11 with a default class set in a configuration database 44 (step 53), resetting a periodical scanning mode as the reset scanning mode when the operated credit class of the user 11 is higher than the default class (step 55), and remaining a real-time scanning mode as the default scanning mode when the operated credit class of the user 11 is lower than the default class (step 54).

For the user 12 and the user 13, their credit data aren't reset The steps 51-55 are executed to respectively calculate the credit data of the user 12 and the user 13 for determining whether the defaulted scanning mode of the user 12 and the user 13 should be changed.

Meanwhile, the periodical scanning mode further includes a periodical scanning period set in the configuration database 44 and adjustable according the credit class of the user. The higher the credit class of the user is, the longer a period of the periodical scanning mode is. The lower the credit class of the user is, the shorter a period of the periodical scanning mode is.

The present invention could be applied to a checking system for managing employees passing in and out in a company or applied to other field. When the data scanning method of the present invention is introduced to managing employees in a company, the data scanning method could prevent from transmitting e-mail of pornography, sending off the application letter, or delivering out e-mail with the confidential information of the company. The company could define the credit class in response to the status of transmitting e-mail of pornography, sending off the application letter, or delivering out e-mail with the confidential information of the company.

Accordingly, the present invention provides a data scanning method for a server to improve the prior art and solve the problem of the prior art by means of introducing a real-time scanning mode, a periodical scanning mode and a credit database, thereby the waste of the extra system sources for scanning and the miss of a scanning timing being decreased.

Although the present invention has been described and illustrated in detail, it is to be clearly understood that the same is by the way of illustration and example only and is not to be taken by way of limitation, the spirit and scope of the present invention being limited only by the terms of the appended claims.

What is claimed is:

1. A data scanning method for a server, comprising steps of:
   (a) defining a predetermined period;
   (b) scanning data accessed by a user from said server in a default scanning mode;
   (c) performing a mapping process for said data to accumulate credit data of said user including the steps of:
   (c1) scanning said data accessed by said user for generating a result;
   (c2) obtaining a credit weight corresponding to said result; and
   (c3) recording said credit weight into a credit database to be accumulated as said credit data of said user; and
   (d) executing a rearranging process for resetting a reset scanning mode for said user according to said credit data of said user when said predetermined period is expired.

2. The data scanning method according to claim 1, wherein said server is a mail server.

3. The data scanning method according to claim 1, wherein said server is a hypertext transfer protocol proxy server.

4. The data scanning method according to claim 1, wherein said predetermined period is adjustable and defined in a configuration database.

5. The data scanning method according to claim 1, wherein said default scanning mode is a real-time scanning mode.

6. The data scanning method according to claim 1, wherein said default scanning mode is a periodical scanning mode.

7. The data scanning method according to claim 1, wherein said data is an electronic mail.

8. The data scanning method according to claim 1, wherein said data is a web page.

9. The data scanning method according to claim 1, wherein said server includes a storage space for storing said data accessed by said user as one of a temporary and a perpetual data.

10. The data scanning method according to claim 9, wherein said storage space is a memory.

11. The data scanning method according to claim 9, wherein said storage space is a hard disk.

12. The data scanning method according to claim 1, wherein said step (c2) is executed via a specific corresponding mode adjustable and defined in a configuration database.

13. The data scanning method according to claim 1, wherein said rearranging process further comprises steps of:
   (d1) calculating an operated credit class of said user according to said credit data of said user;
   (d2) comparing said credit class of said user with a default credit class;
   (d3) resetting a periodical scanning mode when said credit class of said user is higher than said default credit class; and
   (d4) resetting said reset scanning mode as a real-time scanning mode when said credit class of said user is lower than said default credit class.

14. The data scanning method according to claim 13, wherein said default credit class is adjustable and set in a configuration database.

15. The data scanning method according to claim 13, wherein said periodical scanning mode further comprises a periodical scanning period set in a configuration database and adjustable according to said credit class of said user.

16. The data scanning method according to claim 15, wherein the higher said credit class of said user is, the longer said periodical scanning period is.

17. The data scanning method according to claim 15, wherein the lower said credit class of said user is, the shorter said periodical scanning period is.

18. The data scanning method according to claim 1 being implemented via a software program.

19. The data scanning method according to claim 18, wherein said software program is included in said sever.

20. The data scanning method according to claim 18, wherein said software program is an external program.

21. A data scanning method for a server connected to plural user terminals, wherein said server scans data accessed by one of said plural user terminals in a default scanning mode, comprising steps of:
   (a) defining a predetermined period;
   (b) executing a mapping process to accumulate plural credit data corresponding to said plural user terminals respectively; and
   (c) executing a rearranging process for changing said default scanning mode for said plural user terminals respectively according to said plural credit data when said predetermined period is expired including the steps of:
   (c1) calculating a credit class of said one user terminal, said credit data corresponding to said one user terminal;
   (c2) comparing said credit class of said one user terminal with a default credit class;
   (c3) resetting said default scanning mode as a periodical scanning mode when said credit class of said one user terminal is higher than said default credit class;
   (c4) resetting said default scanning mode as a real-time scanning mode when said credit class of said one user terminal is lower than said default credit class; and
   (c5) repeating steps (c1)-(c4) for determining all default scanning modes for said plural user terminals one by one.

22. The data scanning method according to claim 21, wherein said mapping process comprises steps of:
   (b1) scanning said data accessed by said one user terminal for generating a result; and
   (b2) obtaining a credit weight corresponding to said result; and
   (b3) recording said credit weight into a credit database to be accumulated as said credit data corresponding to said one user terminal.

* * * * *